(12) United States Patent
Kawahara et al.

(10) Patent No.: US 8,654,888 B2
(45) Date of Patent: Feb. 18, 2014

(54) PRECODER CIRCUIT

(75) Inventors: Hidetaka Kawahara, Kawasaki (JP); Masayuki Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 857 days.

(21) Appl. No.: 12/610,812

(22) Filed: Nov. 2, 2009

(65) Prior Publication Data

US 2010/0119007 A1 May 13, 2010

(30) Foreign Application Priority Data

Nov. 10, 2008 (JP) ................................. 2008-288002

(51) Int. Cl.
*H04L 27/20* (2006.01)
(52) U.S. Cl.
USPC .......................................... 375/296; 375/308
(58) Field of Classification Search
USPC .................................................. 375/296, 308
See application file for complete search history.

(56) References Cited

U.S. PATENT DOCUMENTS

| | | | |
|---|---|---|---|
| 6,934,308 B1 * | 8/2005 | Yonenaga et al. | 370/535 |
| 7,428,692 B2 | 9/2008 | Konishi et al. | |
| 2006/0193399 A1 | 8/2006 | Katagiri et al. | |
| 2006/0269294 A1 * | 11/2006 | Kikuchi | 398/161 |

FOREIGN PATENT DOCUMENTS

| | | |
|---|---|---|
| JP | 2006-245647 A | 9/2006 |
| JP | 2007-74167 A | 3/2007 |

* cited by examiner

*Primary Examiner* — Michael Neff
(74) *Attorney, Agent, or Firm* — Fujitsu Patent Center

(57) ABSTRACT

A disclosed precoder circuit is used for differential phase shift keying and includes multiple levels of parallel precoder units, each of which is configured to perform a precoding operation using a data signal having multiple symbols and one of a fixed value and a one-symbol preceding modulated signal output from a preceding-level parallel precoder unit so as to obtain a modulated signal, precoding operations of the parallel precoder units being simultaneously performed in a parallel fashion; multiple levels of re-timing units configured to synchronize modulated signals output from the parallel precoder units; and multiple levels of offset units, each of which is configured to add a phase difference between the fixed value and the one-symbol preceding modulated signal to the modulated signals output from the corresponding re-timing units.

9 Claims, 14 Drawing Sheets

FIG.7

| ONE-SYMBOL PRECEDING MODULATED SIGNALS | | BEFORE OFFSET | | AFTER OFFSET | |
|---|---|---|---|---|---|
| $\eta_{8k-1}$ | $\rho_{8k-1}$ | $\eta_{8k}$ | $\rho_{8k}$ | $\eta_{8k}$ | $\rho_{8k}$ |
| 0 (+0°) | 0 | 0 | 0 | 0 | 0 |
| | | 0 | 1 | 0 | 1 |
| | | 1 | 0 | 1 | 0 |
| | | 1 | 1 | 1 | 1 |
| 0 (+270°) | 1 | 0 | 0 | 0 | 1 |
| | | 0 | 1 | 1 | 1 |
| | | 1 | 0 | 0 | 0 |
| | | 1 | 1 | 1 | 0 |
| 1 (+90°) | 0 | 0 | 0 | 1 | 0 |
| | | 0 | 1 | 0 | 0 |
| | | 1 | 0 | 1 | 1 |
| | | 1 | 1 | 0 | 1 |
| 1 (+180°) | 1 | 0 | 0 | 1 | 1 |
| | | 0 | 1 | 1 | 0 |
| | | 1 | 0 | 0 | 1 |
| | | 1 | 1 | 0 | 0 |

PRECODER CIRCUIT

CROSS-REFERENCE TO RELATED APPLICATIONS

This application is based upon and claims the benefit of priority of Japanese Patent Application 2008-288002, filed on Nov. 10, 2008, the entire contents of which are incorporated herein by reference.

FIELD

The present disclosure is directed to a precoder circuit used for differential phase shift keying modulation.

BACKGROUND

In recent years, optical modulations, such as differential phase shift keying (DPSK) and differential quadrature phase shift keying (DQPSK), have attracted attention as technologies enabling high bit-rate optical transmission of 40 Gb/s or more.

DQPSK has advantages in long-distance transmission, dense multiplexing/high capacity transmission and design performance, usability and the like, compared to publicly known optical modulations including general non-return-to-zero (NRZ) modulation, carrier suppressed return-to-zero modulation (CS-RZ) and return-to-zero differential phase shift keying. Note that DQPSK in the present specification includes RZ-DQPSK, in which a DQPSK signal is return-to-zero pulsed, and carrier-suppressed RZ-DQPSK.

A brief description is given below of a DQPSK-applied optical transmitter and a DQPSK-applied optical receiver. As a DQPSK-applied optical transmitter, one having a basic configuration illustrated in FIG. 1, for example, is known.

In the optical transmitter, continuous light emitted from an optical source 3-1, such as a distributed feedback laser (DFB), is divided into two elements, and one of the elements is input to a first phase modulator (PM) 3-2 and the other is input to a second phase modulator (PM) 3-3 and a phase converter 3-4.

The phase modulators (PM) 3-2 and 3-3 are independently driven according to modulated signals $\rho_k$ and $\eta_k$, respectively, generated by a precoder 3-5 using two data signals $I_k$ and $Q_k$, and selectively change the phase of each input light element to 0 or $\pi$ [rad]. As compared to the light passing through the light path of the phase modulator (PM) 3-2, a phase difference of $\pi/2$ is given to the light passing through the light path of the phase modulator (PM) 3-3 by the phase converter 3-4.

Accordingly, while the light output from the light path of the phase modulator (PM) 3-2 is a light signal created by shifting the phase of the light from the optical source 3-1 by 0 or $\pi$, the light output from the light path of the phase modulator (PM) 3-3 is a light signal created by deviating the phase of the light from the optical source 3-1 by $\pi/2$ or $3\pi/2$. Then, by multiplexing the light output from these light paths, it is possible to generate DQPSK signal light with four different phases, $\pi/4$, $3\pi/4$, $5\pi/4$ and $7\pi/4$.

The bit rate of the DQPSK signal light is twice the bit rate of the data signals $I_k$ and $Q_k$ processed by the precoder 3-5. Therefore, in order to transmit DQPSK signal light of 40 Gb/s, for example, the individual phase modulators (PM) 3-2 and 3-3 are driven using data signals of 20 Gb/s.

The DQPSK signal light is RZ-pulsed (return-to-zero pulsed) by an intensity modulator 3-7 driven by a clock signal having a duty ratio of 50%, which clock signal is in sync with the data signals, whereby RZ-DQPSK signal light is generated. In addition, by setting the duty ratio of the clock signal to 66% or the like, CSRZ-DQPSK (carrier suppression return-to-zero DQPSK) signal light is generated.

The precoder 3-5 performs logical operations of Equations (2) below, which are obtained by developing and sorting Equations (1).

[Equations 1 and Equations 2]

$$\rho_k = \overline{\frac{\overline{(I_k \oplus \rho_{k-1})}(I_k \oplus \eta_{k-1})(\rho_{k-1} \oplus \eta_{k-1}) +}{\overline{(Q_k \oplus \rho_{k-1})}(Q_k \oplus \overline{\eta_{k-1}})(\rho_{k-1} \oplus \overline{\eta_{k-1}})}}$$

$$\eta_k = \overline{\frac{\overline{(Q_k \oplus \eta_{k-1})}(Q_k \oplus \rho_{k-1})(\rho_{k-1} \oplus \eta_{k-1}) +}{\overline{(I_k \oplus \eta_{k-1})}(I_k \oplus \overline{\rho_{k-1}})(\overline{\rho_{k-1}} \oplus \eta_{k-1})}} \quad (1)$$

$$\rho_k = Q_k \rho_{k-1} \eta_{k-1} + I_k \rho_{k-1} \overline{\eta_{k-1}} + \overline{I_k \rho_{k-1}} \eta_{k-1} + \overline{Q_k \rho_{k-1} \eta_{k-1}}$$

$$\eta_k = I_k \rho_{k-1} \eta_{k-1} + \overline{Q_k} \rho_{k-1} \overline{\eta_{k-1}} + Q_k \overline{\rho_{k-1}} \eta_{k-1} + \overline{I_k \rho_{k-1} \eta_{k-1}} \quad (2)$$

In Equations (1) and (2) above, $I_k$ and $Q_k$ are logical values (1 or 0) of the k-th clock cycle signals (i.e. signals in the k-th clock cycle) to be input to the precoder 3-5 illustrated in FIG. 1, and $\rho_k$ and $\eta_k$ are logical values (1 or 0) of the k-th clock cycle signals output from the precoder 3-5. The suffix k−1 indicates that a value to which the suffix is attached is a logical value in the clock cycle immediately preceding the k-th clock cycle.

According to the configuration example illustrated in FIG. 1, in order to implement the logical operations, the output signals $\rho_k$ and $\eta_k$ of the precoder 3-5 are fed back to the input of the precoder 3-5 via delay elements 3-6, each of which applies a one-symbol time delay $\tau$. A specific configuration of the precoder 3-5 is illustrated in FIG. 2. With reference to FIG. 2, logical values one symbol before the logical values $\rho_k$ and $\eta_k$ are fed back via delay elements D which apply the time delay $\tau$.

In addition, a parallel precoder circuit having, for example, a configuration illustrated in FIG. 3 is known as a mechanism for implementing the logical operations of the precoder 3-5 of FIG. 2 at low speed (see Japanese Laid-open Patent Application Publication No. 2006-245647).

The parallel precoder circuit of FIG. 3 is configured in the following way. A parallel precoder unit 4 is provided in which eight precoders, each implementing the logical operations of Equations (2) above, are disposed parallel to each other. The logical operations are simultaneously performed on sequentially taken-out eight symbols of each data signal I and Q in a parallel fashion. In the next cycle, the logical operations are again simultaneously performed on the subsequent eight symbols of each data signal I and Q in a parallel fashion. The same operation process is subsequently repeated.

That is, the following eight precoders are provided: a first precoder 4-1 for performing the logical operations on the $8k^{th}$ data signals $I_{8k}$ and $Q_{8k}$; a second precoder 4-2 for performing the logical operations on the $8k+1^{st}$ data signals $I_{8k+1}$ and $Q_{8k+1}$; a third precoder (not shown) for performing the logical operations on the $8k+2^{nd}$ data signals $I_{8k+2}$ and $Q_{8k+2}$; a fourth precoder (not shown) for performing the logical operations on the $8k+3^{rd}$ data signals $I_{8k+3}$ and $Q_{8k+3}$; a fifth precoder (not shown) for performing the logical operations on the $8k+4^{th}$ data signals $I_{8k+4}$ and $Q_{8k+4}$; a sixth precoder (not shown) for performing the logical operations on the $8k+5^{th}$ data signals $I_{8k+5}$ and $Q_{8k+5}$; a seventh precoder 4-7 for performing the logical operations on the $8k+6^{th}$ data signals $I_{8k+6}$ and $Q_{8k+6}$; and an eighth precoder 4-8 for performing the logical operations on the $8k+7^{th}$ data signals $I_{8k+7}$ and $Q_{8k+7}$. Operation results $\rho_{8k}$ and $\eta_{8k}$ through $\rho_{8k+7}$ and $\eta_{8k+7}$ of the individual precoders 4-1 through 4-8 are synchronized with each other by eight flip-flops that make up a re-timing unit 5, and are output as DQPSK modulation signals.

A connection is established in such a manner that each set of the operation results $\rho_{8k}$ and $\eta_{8k}$ through $\rho_{8k+7}$ and $\eta_{8k+7}$ is input to the next-level precoder as operation results $\rho_{8k-1}$ and $\eta_{8k-1}$ via the re-timing unit 5. That is, the operation results of $\rho_{8k}$ and $\eta_{8k}$ of the first precoder 4-1 are input to the next second precoder 4-2; the operation results of $\rho_{8k+1}$ and $\eta_{8k+1}$ of the second precoder 4-2 are input to the next third precoder (not shown); the operation results of $\rho_{8k+2}$ and $\eta_{8k+2}$ of the third precoder are input to the next fourth precoder (not shown); the operation results of $\rho_{8k+3}$ and $\eta_{8k+3}$ of the fourth precoder are input to the next fifth precoder (not shown); the operation results of $\rho_{8k+4}$ and $\eta_{8k+4}$ of the fifth precoder are input to the next sixth precoder (not shown); the operation results of $\rho_{8k+5}$ and $\eta_{8k+5}$ of the sixth precoder are input to the next seventh precoder 4-7; the operation results of $\rho_{8k+6}$ and $\eta_{8k+6}$ of the seventh precoder 4-7 are input to the next eighth precoder 4-8; and the operation results of $\rho_{8k+7}$ and $\eta_{8k+7}$ of the eighth precoder 4-8 are input to the next first precoder 4-1 (i.e. the next-level precoder in the next logical operation cycle).

The logical operations performed in the first through eighth precoders 4-1 through 4-8 are expressed by Equations (3) below.

[Equations 3]

$$\rho_{8k} = \frac{Q_{8k}\rho_{8k-1}\eta_{8k-1} + I_{8k}\rho_{8k-1}\overline{\eta_{8k-1}} +}{\overline{I_{8k}\rho_{8k-1}}\eta_{8k-1} + \overline{Q_{8k}\rho_{8k-1}\eta_{8k-1}}}$$

$$\rho_{8k+1} = \frac{Q_{8k+1}\rho_{8k}\eta_{8k} + I_{8k+1}\rho_{8k}\overline{\eta_{8k}} +}{\overline{I_{8k+1}\rho_{8k}}\eta_{8k} + \overline{Q_{8k+1}\rho_{8k}\eta_{8k}}}$$

$$\vdots$$

$$\rho_{8k+7} = \frac{Q_{8k+7}\rho_{8k+6}\eta_{8k+6} + I_{8k+7}\rho_{8k+6}\overline{\eta_{8k+6}} +}{\overline{I_{8k+7}\rho_{8k+6}}\eta_{8k+6} + \overline{Q_{8k+7}\rho_{8k+6}\eta_{8k+6}}}$$

$$\eta_{8k} = \frac{I_{8k}\rho_{8k-1}\eta_{8k-1} + \overline{Q_{8k}\rho_{8k-1}}\overline{\eta_{8k-1}} +}{Q_{8k}\overline{\rho_{8k-1}}\eta_{8k-1} + \overline{I_{8k}\rho_{8k-1}\eta_{8k-1}}}$$

$$\eta_{8k+1} = \frac{I_{8k+1}\rho_{8k}\eta_{8k} + \overline{Q_{8k+1}\rho_{8k}}\overline{\eta_{8k}} +}{Q_{8k+1}\overline{\rho_{8k}}\eta_{8k} + \overline{I_{8k+1}\rho_{8k}\eta_{8k}}}$$

$$\vdots$$

$$\eta_{8k+7} = \frac{I_{8k+7}\rho_{8k+6}\eta_{8k+6} + \overline{Q_{8k+7}\rho_{8k+6}}\overline{\eta_{8k+6}} +}{Q_{8k+7}\overline{\rho_{8k+6}}\eta_{8k+6} + \overline{I_{8k+7}\rho_{8k+6}\eta_{8k+6}}}$$

(3)

The number n of precoders making up the parallel precoder unit 4 is changed depending on the data volumes of signals to be handled (the bit count of data) and the operation clock, and in the case where the data volumes are large, timing margins cannot be ensured.

In each of the first to eighth precoders 4-1 through 4-8, up to four logic circuits (AND circuits and OR circuits) are cascade-connected, as illustrated in FIG. 2. If the number n of precoders making up the parallel precoder unit 4 becomes large (for example, n=32), up to n×4 logic circuits are cascade-connected, which poses the problem that timing margins cannot be ensured.

In general, in order to ensure timing margins, cascade-connected logic circuits are divided, and operations are processed in multiple cycles while re-timing is performed by flip-flops. However, according to structural limitations of the precoder circuit, the operations of the one-cycle preceding modulated signals $\rho_{8k+7}$ and $\eta_{8k+7}$ and the current data $I_{8k}$ and $Q_{8k}$ have to be performed in one cycle, and therefore, the above-mentioned method of processing the operations in multiple cycles cannot be applied.

SUMMARY

The precoder circuit of the present disclosure is used for differential phase shift keying and includes multiple levels of parallel precoder units, each of which is configured to perform a precoding operation using a data signal having multiple symbols and one of a fixed value and a one-symbol preceding modulated signal output from a preceding-level parallel precoder unit so as to obtain a modulated signal, the precoding operations of the parallel precoder units being simultaneously performed in a parallel fashion; multiple levels of re-timing units configured to synchronize modulated signals output from the parallel precoder units; and multiple levels of offset units, each of which is configured to add a phase difference between the fixed value and the one-symbol preceding modulated signal to the modulated signals output from the corresponding re-timing units.

The object and advantages of the disclosure will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 shows values of modulated signals before and after an offset process;

DESCRIPTION OF EMBODIMENTS

Embodiments that describe the best mode for carrying out the present disclosure are explained next with reference to the drawings.

First Embodiment

Figure 1:
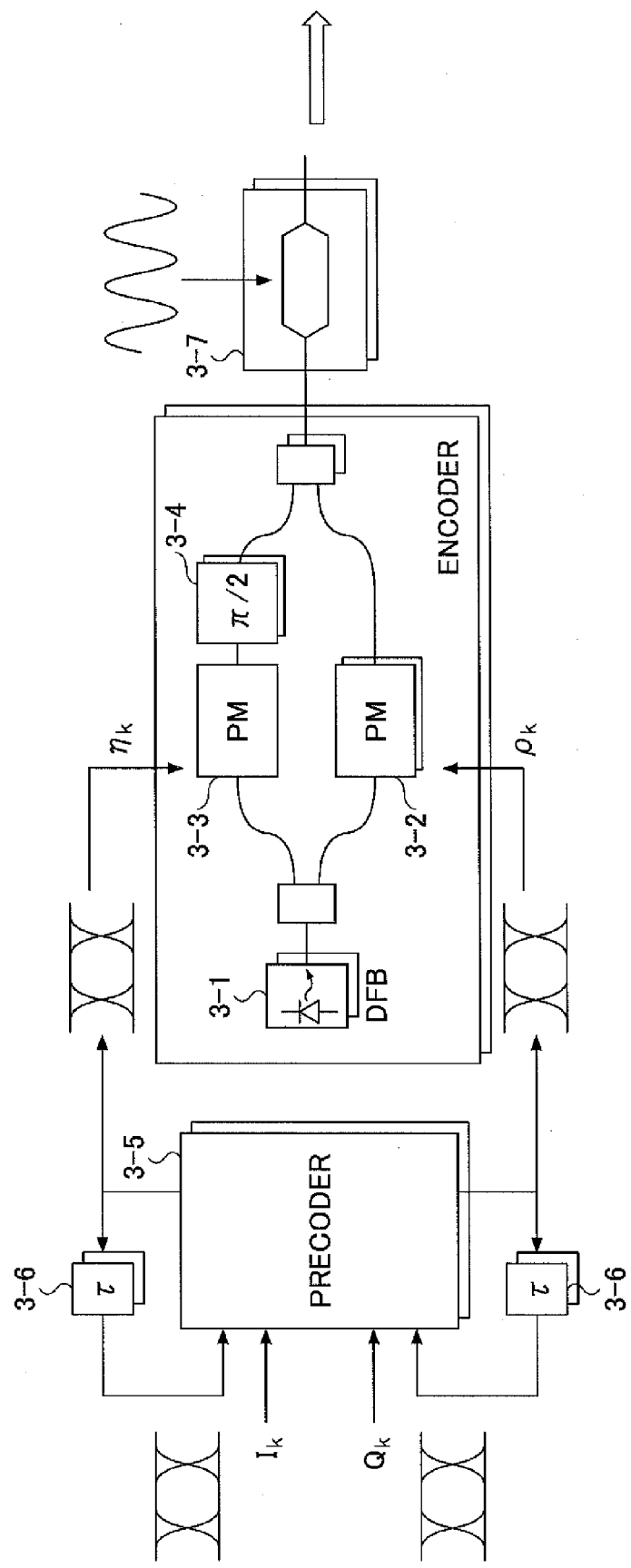
FIG. 1 shows a configuration of a QPSK-applied optical transmitter.
Figure 2:
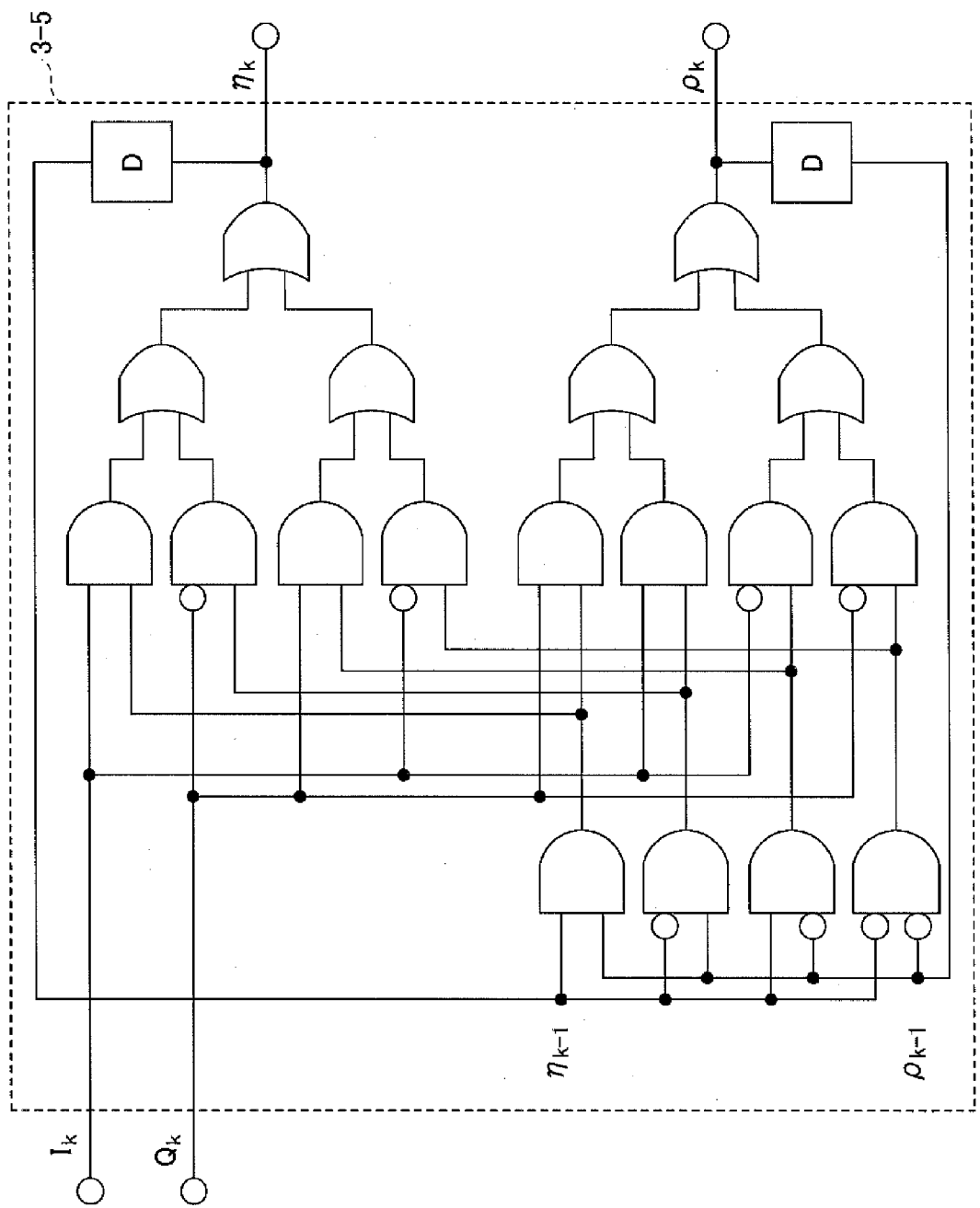
FIG. 2 shows a specific configuration of a precoder of FIG. 1.
Figure 3:
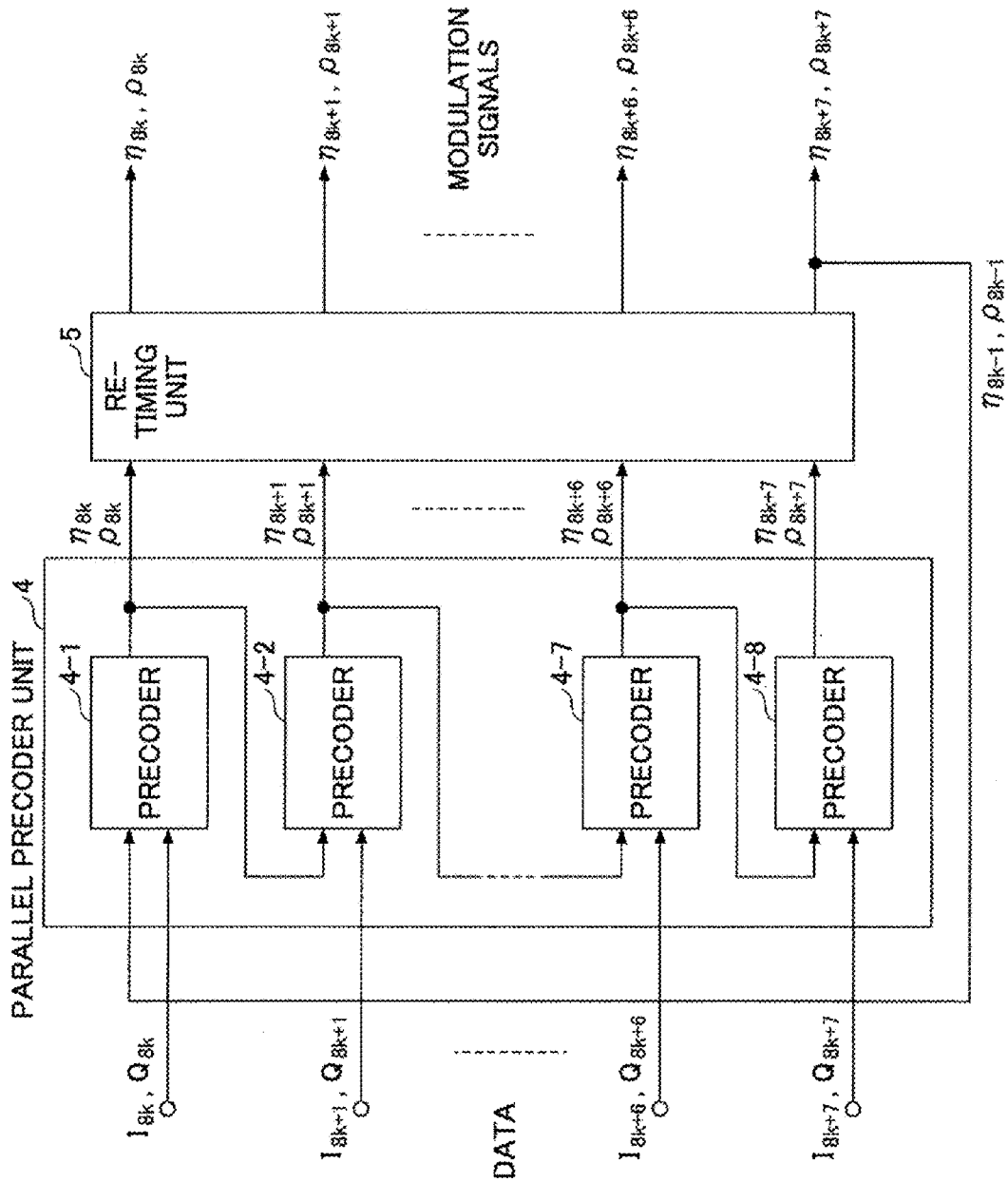
FIG. 3 shows a configuration of a parallel precoder circuit.
Figure 4:
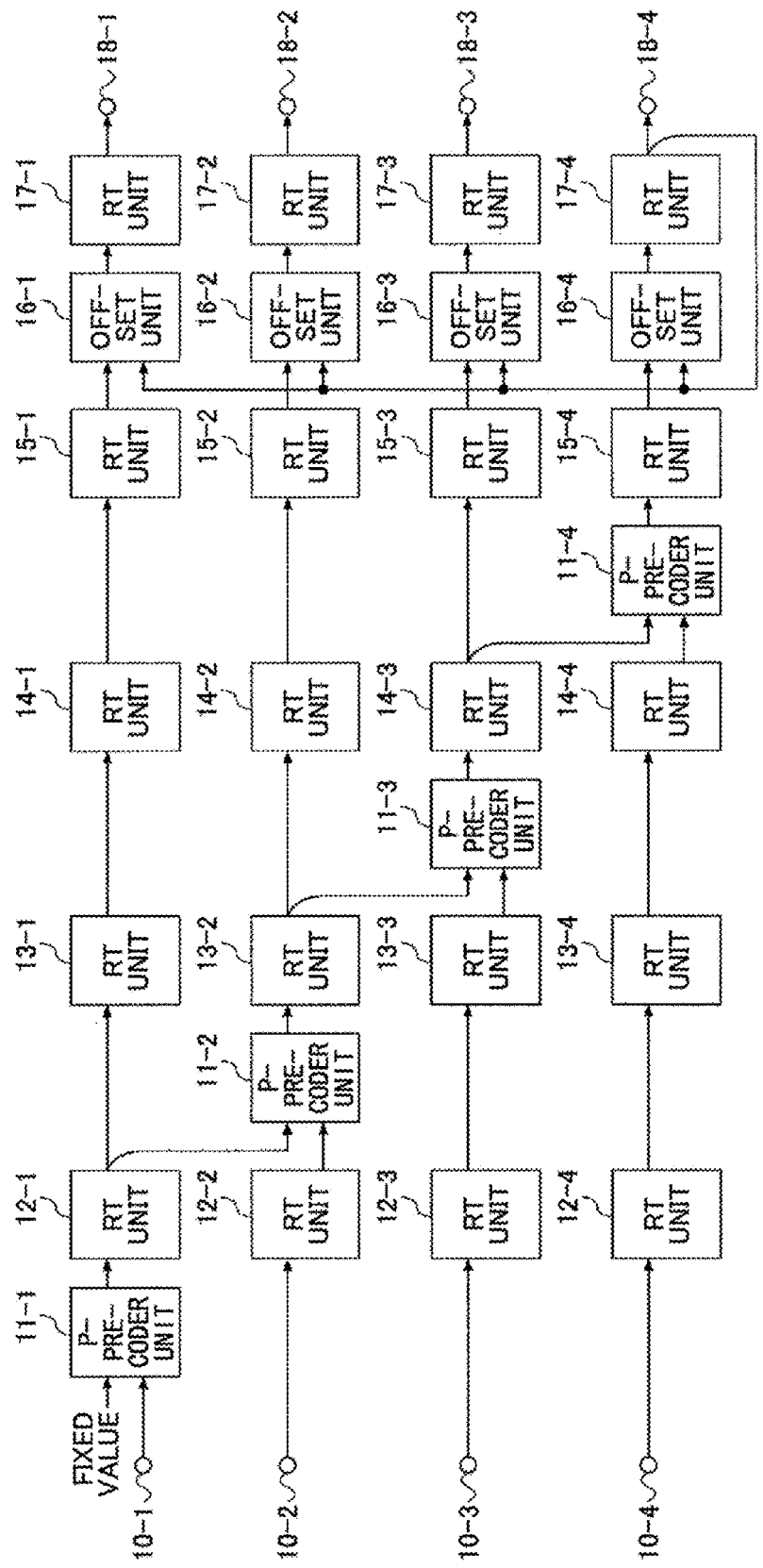
FIG. 4 shows a configuration of a precoder circuit according to the first embodiment.

FIG. 4 shows a configuration of a precoder circuit according to the first embodiment. In FIG. 4, signals of two channels, a data signal I for one channel and a data signal Q for the other, are input to each terminal 10-1, 10-2, 10-3 and 10-4. Each channel includes 8 symbols. The data signals I and Q of the two channels of the terminal 10-1 are supplied to a parallel precoder unit 11-1, and the data signals I and Q of the two channels of each of the terminals 10-2, 10-3 and 10-4 are supplied to re-timing units 12-2, 12-3 and 12-4, respectively.

The parallel precoder unit 11-1 on the first level includes eight precoders. Instead of one-symbol preceding modulated signals, fixed values (0 and 0, for example) are supplied to the parallel precoder unit 11-1, which then performs precoding operations using the fixed values and the two-channel data signals I and Q obtained from the terminal 10-1. Two-channel modulated signals output from the parallel precoder unit 11-1 are supplied to a re-timing unit 12-1, at which the modulated signals are synchronized with signals output from the re-timing units 12-2, 12-3 and 12-4. That is, the modulated signals are output from the re-timing unit 12-1 in the same phase as the signals output from the re-timing units 12-2, 12-3 and 12-4. Then, the modulated signals are sequentially supplied to re-timing units 13-1, 14-1 and 15-1. In addition, a part (the last level) of the modulated signals output from the re-timing unit 12-1 is supplied to a parallel precoder unit 11-2 as one-symbol preceding modulated signals.

The parallel precoder unit 11-2 includes eight precoders, and performs precoding operations using the one-symbol preceding modulated signals ρ and η supplied from the re-timing unit 12-1 and the two-channel data signals I and Q passing through the re-timing unit 12-2. Two-channel modulated signals output from the parallel precoder unit 11-2 are supplied to a re-timing unit 13-2, at which the modulated signals are synchronized with signals output from the re-timing units 13-1, 13-3 and 13-4. Then, the modulated signals are sequentially supplied to re-timing unit 14-2 and 15-2. In addition, a part (the last level) of the modulated signals output from the re-timing unit 13-2 is supplied to a parallel precoder unit 11-3 as one-symbol preceding modulated signals.

The parallel precoder unit 11-3 includes eight precoders, and performs precoding operations using the one-symbol preceding modulated signals ρ and η supplied from the re-timing unit 13-2 and the two-channel data signals I and Q passing through the re-timing units 12-3 and 13-3. Two-channel modulated signals output from the parallel precoder unit 11-3 are supplied to a re-timing unit 14-3, at which the modulated signals are synchronized with signals output from the re-timing units 14-1, 14-2 and 14-4. Then, the modulated signals are supplied to a re-timing unit 15-3. In addition, a part (the last level) of the modulated signals output from the re-timing unit 14-3 is supplied to a parallel precoder unit 11-4 as one-symbol preceding modulated signals.

The parallel precoder unit 11-4 includes eight precoders, and performs precoding operations using the one-symbol preceding modulated signals ρ and η supplied from the re-timing unit 14-3 and the two-channel data signals I and Q passing through the re-timing units 12-4, 13-4 and 14-4. Two-channel modulated signals output from the parallel precoder unit 11-4 are supplied to a re-timing unit 15-4 in synchronization with the signals I and Q of the terminal 10-4.

The two-channel modulated signals output from the re-timing units 15-1, 15-2, 15-3 and 15-4 in synchronization with each other are supplied to offset units 16-1, 16-2, 16-3 and 16-4, respectively, at which offset operations are performed on the individual set of the two-channel modulated signals output from the re-timing units 15-1, 15-2, 15-3 and 15-4, using one-symbol preceding modulated signals obtained in the preceding operation and supplied from a last-level re-timing unit 17-4.

The two-channel modulated signals output from the offset units 16-1, 16-2, 16-3 and 16-4 are synchronized with each other, i.e. arranged in the same phase, by the re-timing units 17-1, 17-2, 17-3 and 17-4, respectively, and then output from terminals 18-1, 18-2, 18-3 and 18-4, respectively.

Each re-timing unit includes eight D flip-flops aligned parallel to each other, which D flip-flops operate in synchronization with each other under the supply of the same clock signal.

[Configuration of Parallel Precoder Unit]

Figure 5:
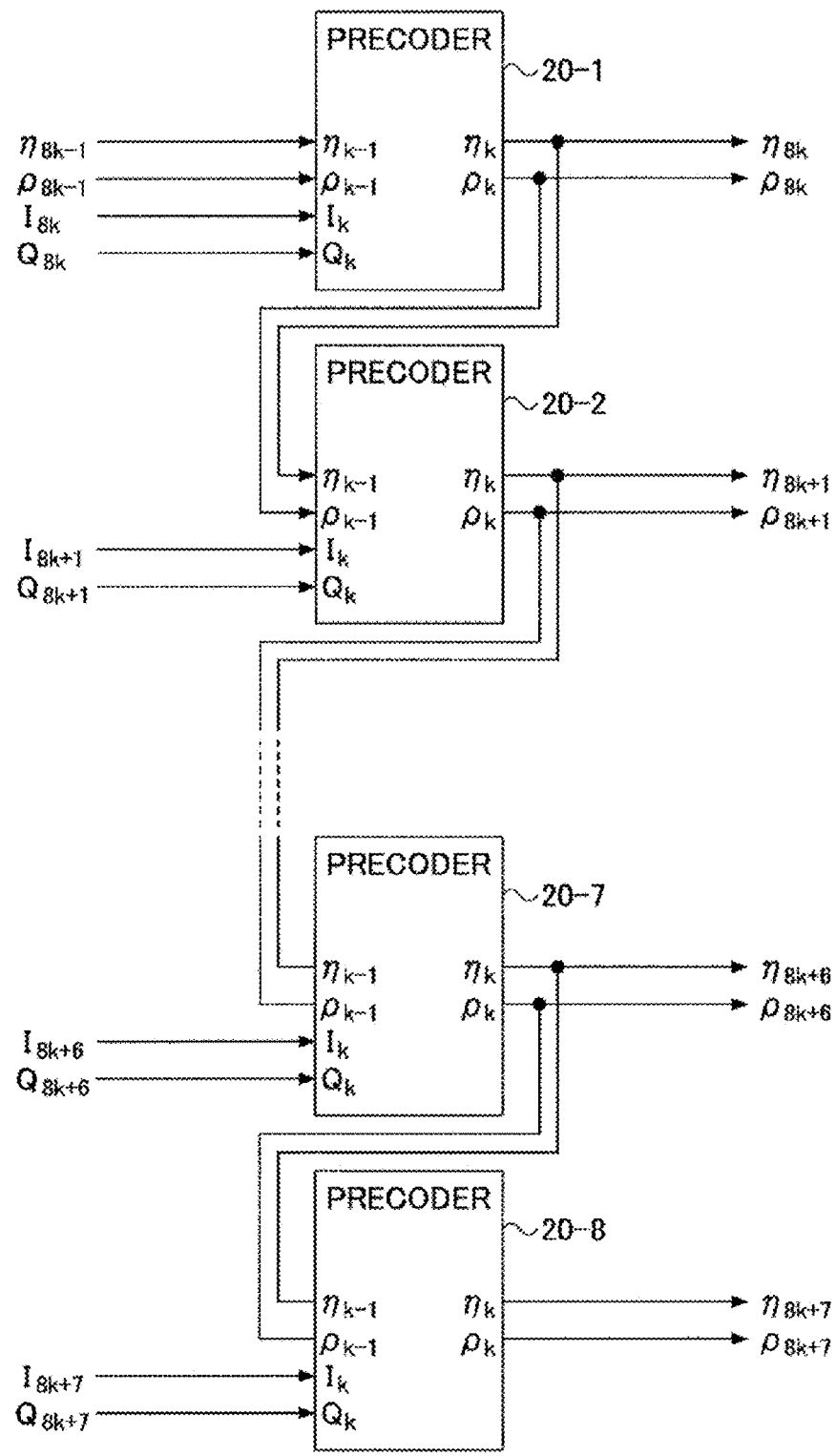
FIG. 5 shows a configuration of a parallel precoder unit according to one embodiment.

FIG. 5 shows a configuration of a parallel precoder unit used as the parallel precoder units 11-1 through 11-4 according to one embodiment. With reference to FIG. 5, eight precoders for performing the above-described logical operations using Equations (2) are provided parallel to each other. The logical operations are simultaneously performed on sequentially taken-out eight symbols (the data signals I and Q) in a parallel fashion.

The following eight precoders are provided: a first (first-level) precoder 20-1 for performing the logical operations on the $8k^{th}$ data signals $I_{8k}$ and $Q_{8k}$; a second precoder 20-2 for performing the logical operations on the $8k+1^{st}$ data signals $I_{8k+1}$ and $Q_{8k+1}$; a third precoder (not shown) for performing the logical operations on the $8k+2^{nd}$ data signals $I_{8k+2}$ and $Q_{8k+2}$; a fourth precoder (not shown) for performing the logical operations on the $8k+3^{rd}$ data signals $I_{8k+3}$ and $Q_{8k+3}$; a fifth precoder (not shown) for performing the logical operations on the $8k+4^{th}$ data signals $I_{8k+4}$ and $Q_{8k+4}$; a sixth precoder (not shown) for performing the logical operations on the $8k+5^{th}$ data signals $I_{8k+5}$ and $Q_{8k+5}$; a seventh precoder 20-7 for performing the logical operations on the $8k+6^{th}$ data signals $I_{8k+6}$ and $Q_{8k+6}$; and an eighth precoder 20-8 for performing the logical operations on the $8k+7^{th}$ data signals $I_{8k+7}$ and $Q_{8k+7}$. Operation results $\rho_{8k}$ and $\eta_{8k}$ through $\rho_{8k+7}$ and $\eta_{8k+7}$ of the individual precoders 20-1 through 20-8 are synchronized by the eight flip-flops that make up the re-timing unit 5, and are output as DQPSK modulation signals. Operation results $\rho_{8k}$ and $\eta_{8k}$ through $\rho_{8k+7}$ and $\eta_{8k+7}$ of the individual precoders 20-1 through 20-8 are output as DQPSK modulated signals.

A connection is established in the following manner: fixed values (0 and 0, for example) or the operation results $\rho_{8k-1}$ and $\eta_{8k-1}$ of the previous-level parallel precoder unit are input to the first precoder 20-1; the operation results $\rho_{8k}$ and $\eta_{8k}$ of the first precoder 20-1 are input to the next second precoder 20-2; the operation results $\rho_{8k+1}$ and $\eta_{8k+1}$ of the second precoder 20-2 are input to the next third precoder (not shown); the operation results $\rho_{8k+2}$ and $\eta_{8k+2}$ of the third precoder are input to the next fourth precoder (not shown); the operation results $\rho_{8k+3}$ and $\eta_{8k+3}$ of the fourth precoder are input to the next fifth precoder (not shown); the operation results $\rho_{8k+4}$ and $\eta_{8k+4}$ of the fifth precoder are input to the next sixth precoder (not shown); the operation results $\rho_{8k+5}$ and $\eta_{8k+5}$ of the sixth precoder are input to the next seventh precoder 20-7; and the operation results $\rho_{8k+6}$ and $\eta_{8k+6}$ of the seventh precoder 20-7 are input to the next eighth precoder 20-8.

Figure 6:
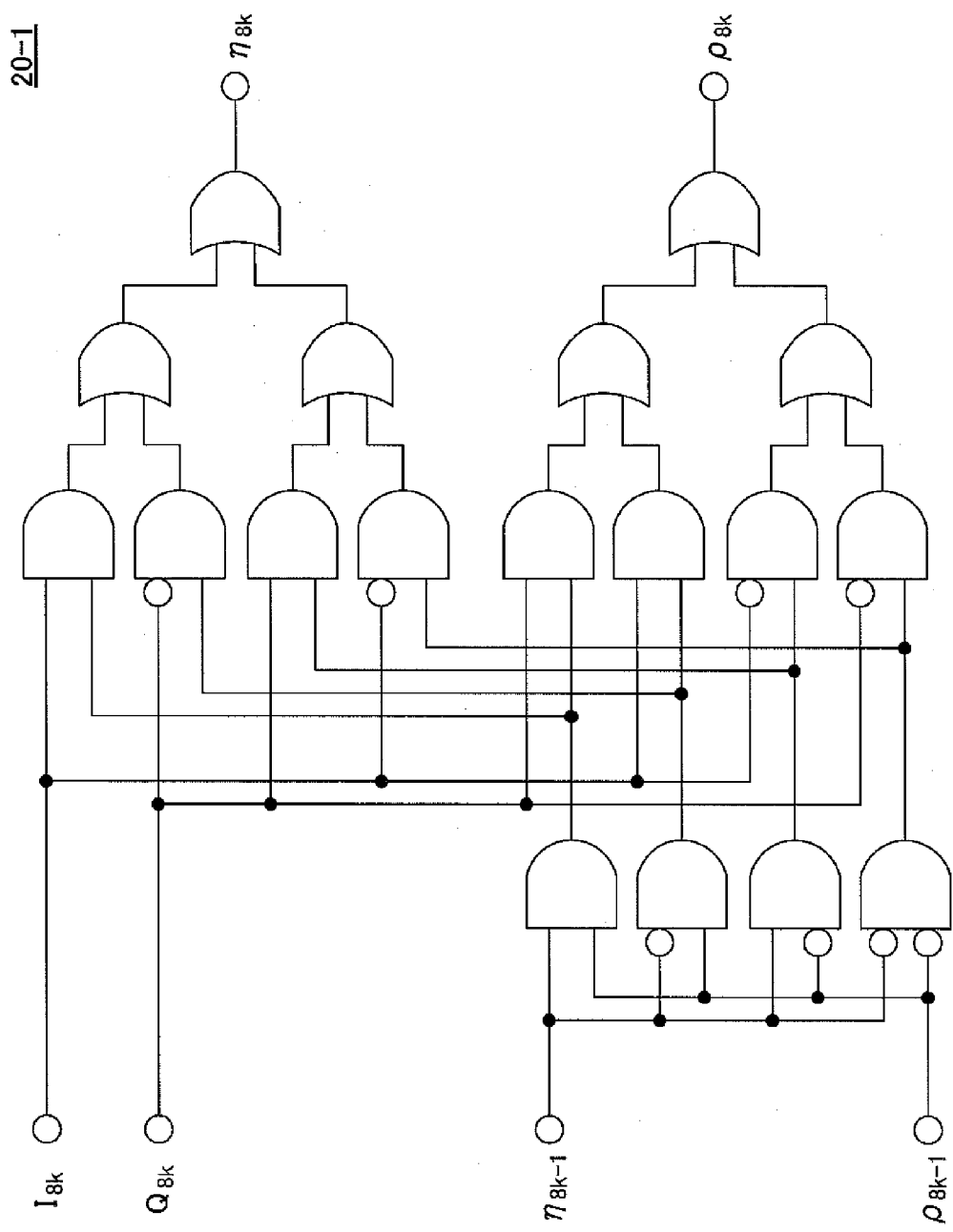
FIG. 6 shows a specific circuit configuration of a precoder of FIG. 5.

The logical operations performed in the first through eighth precoders 20-1 through 20-8 are expressed by Equations (3) above. A specific circuit configuration of the precoder 20-1 is illustrated in FIG. 6. The precoders 20-2 through 20-8 have the same configuration.

[Configuration of Offset Unit]

FIG. 7 shows values of the modulated signals $\rho_{8k}$ and $\eta_{8k}$ before and after the offset process, obtained in the cases where the one-symbol preceding modulated signals $\rho_{8k-1}$ and $\eta_{8k-1}$ output from the re-timing unit 17-4 are [0, 0], [0, 1], [1, 0] and [1, 1], respectively, when the fixed values [0, 0] are input to the parallel precoder unit 11-1.

That is, in the case where the one-symbol preceding modulated signals are [0, 0], there is no difference from the fixed values [0, 0], whereby the values before the offset process become the values after the offset process.

In the case where the one-symbol preceding modulated signals are [0, 1], the difference from the fixed values [0, 0] is +270°, and therefore, modulated signals obtained by adding a phase difference corresponding to +270° to the values before the offset process become the values after the offset process.

In the case where the one-symbol preceding modulated signals are [1, 0], the difference from the fixed values [0, 0] is +90°, and therefore, modulated signals obtained by adding a phase difference corresponding to +90° to the values before the offset process become the values after the offset process.

In the case where the one-symbol preceding modulated signals are [1, 1], the difference from the fixed values [0, 0] is +180°, and therefore, modulated signals obtained by adding a phase difference corresponding to +180° to the values before the offset process become the values after the offset process.

Figure 8:
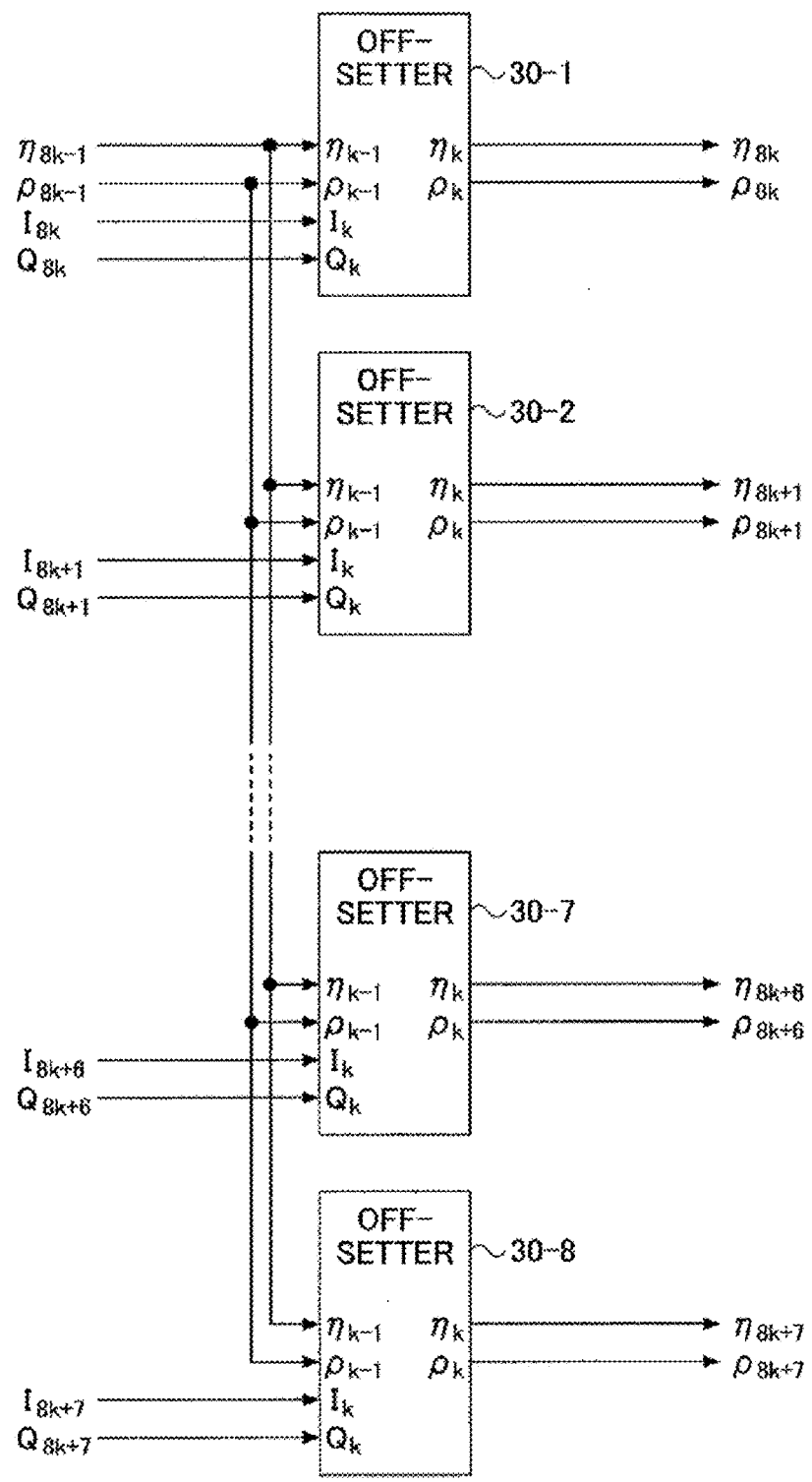
FIG. 8 shows a configuration of an offset unit according to one embodiment.

FIG. 8 shows a configuration of an offset unit used as the offset unit 16-1 through 16-4 according to one embodiment. With reference to FIG. 8, eight off-setters for performing the logical operations of FIG. 7 are provided parallel to each other, and the logical operations are simultaneously performed on sequentially taken-out eight symbols (the data signals I and Q) in a parallel fashion.

The following eight off-setters are provided: a first off-setter 30-1 for performing the logical operations on the $8k^{th}$ data signals $I_{8k}$ and $Q_{8k}$; a second off-setter 30-2 for performing the logical operations on the $8k+1^{st}$ data signals $I_{8k+1}$ and $Q_{8k+1}$; a third off-setter (not shown) for performing the logical operations on the $8k+2^{nd}$ data signals $I_{8k+2}$ and $Q_{8k+2}$; a fourth off-setter (not shown) for performing the logical operations on the $8k+3^{rd}$ data signals $I_{8k+3}$ and $Q_{8k+3}$; a fifth off-setter (not shown) for performing the logical operations on the $8k+4^{th}$ data signals $I_{8k+4}$ and $Q_{8k+4}$; a sixth off-setter (not shown) for performing the logical operations on the $8k+5^{th}$ data signals $I_{8k+5}$ and $Q_{8k+5}$; a seventh off-setter 30-7 for performing the logical operations on the $8k+6^{th}$ data signals $I_{8k+6}$ and $Q_{8k+6}$; and an eighth off-setter 30-8 for performing the logical operations on the $8k+7^{th}$ data signals $I_{8k+7}$ and $Q_{8k+7}$. Operation results $\rho_{8k}$ and $\eta_{8k}$ through $\rho_{8k+7}$ and $\eta_{8k+7}$ of the individual off-setters 30-1 through 30-8 are output as modulated signals after the offset processes.

Figure 9:
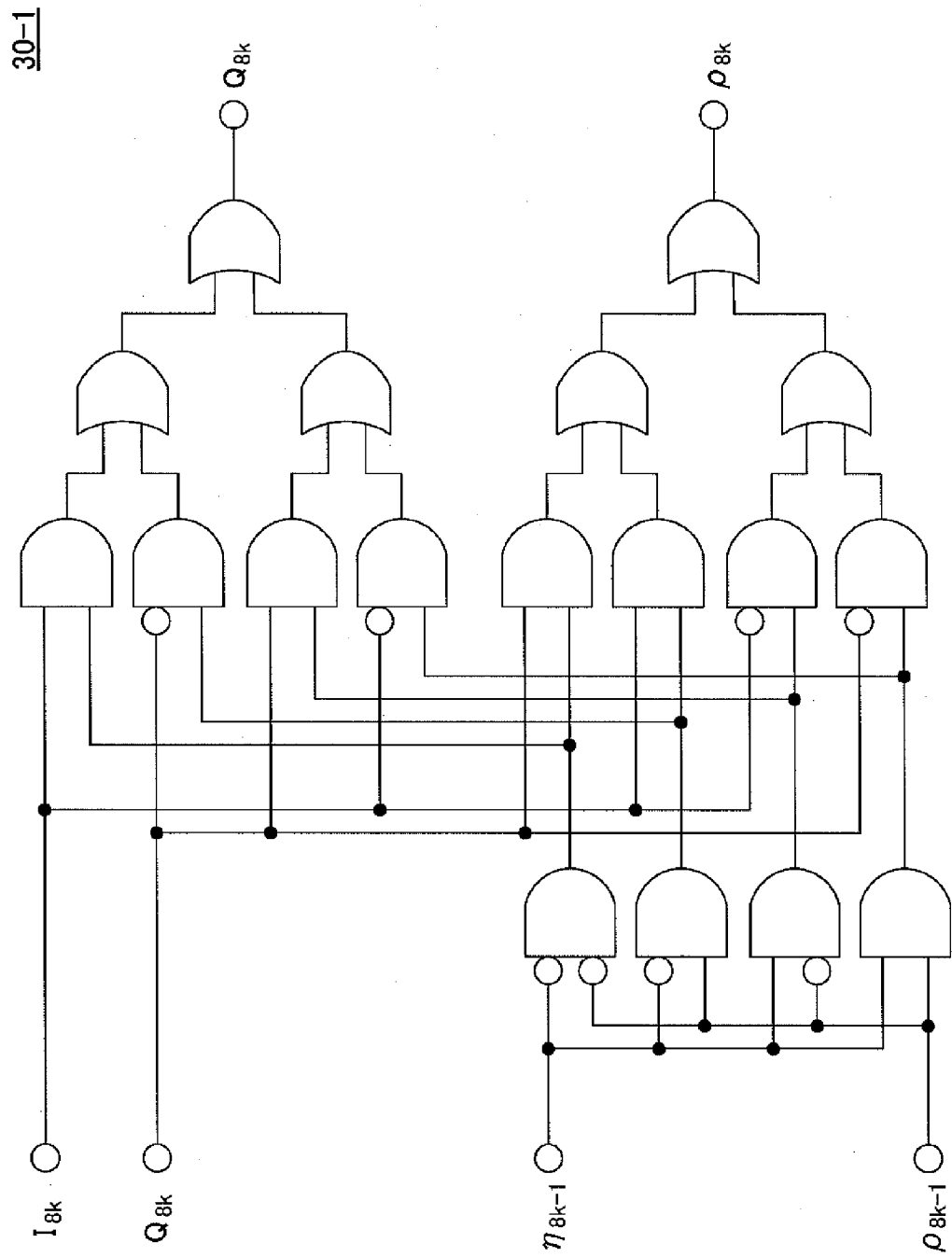
FIG. 9 shows a specific circuit configuration of an off-setter of FIG. 8.

A connection is established in such a manner that the one-symbol preceding modulated signals $\rho_{8k-1}$ and $\eta_{8k-1}$ in the preceding operation are input to all the off-setters 30-1 through 30-8. A specific circuit configuration of the off-setter 30-1 is illustrated in FIG. 9. The off-setters 30-2 through 30-8 have the same configuration.

Thus, the precoding operations using the fixed values and the 8-channel data of the current operations are performed by the parallel precoder units 11-1 through 11-4 and the re-timing units 12-1 through 15-4, and the phases of the precoding operation results of the 8-channel data are changed by the offset units 16-1 through 16-4 according to the one-symbol preceding modulated signals. Therefore, even if the data volumes are large, precoding is achieved in one cycle.

Second Embodiment

Figure 10:
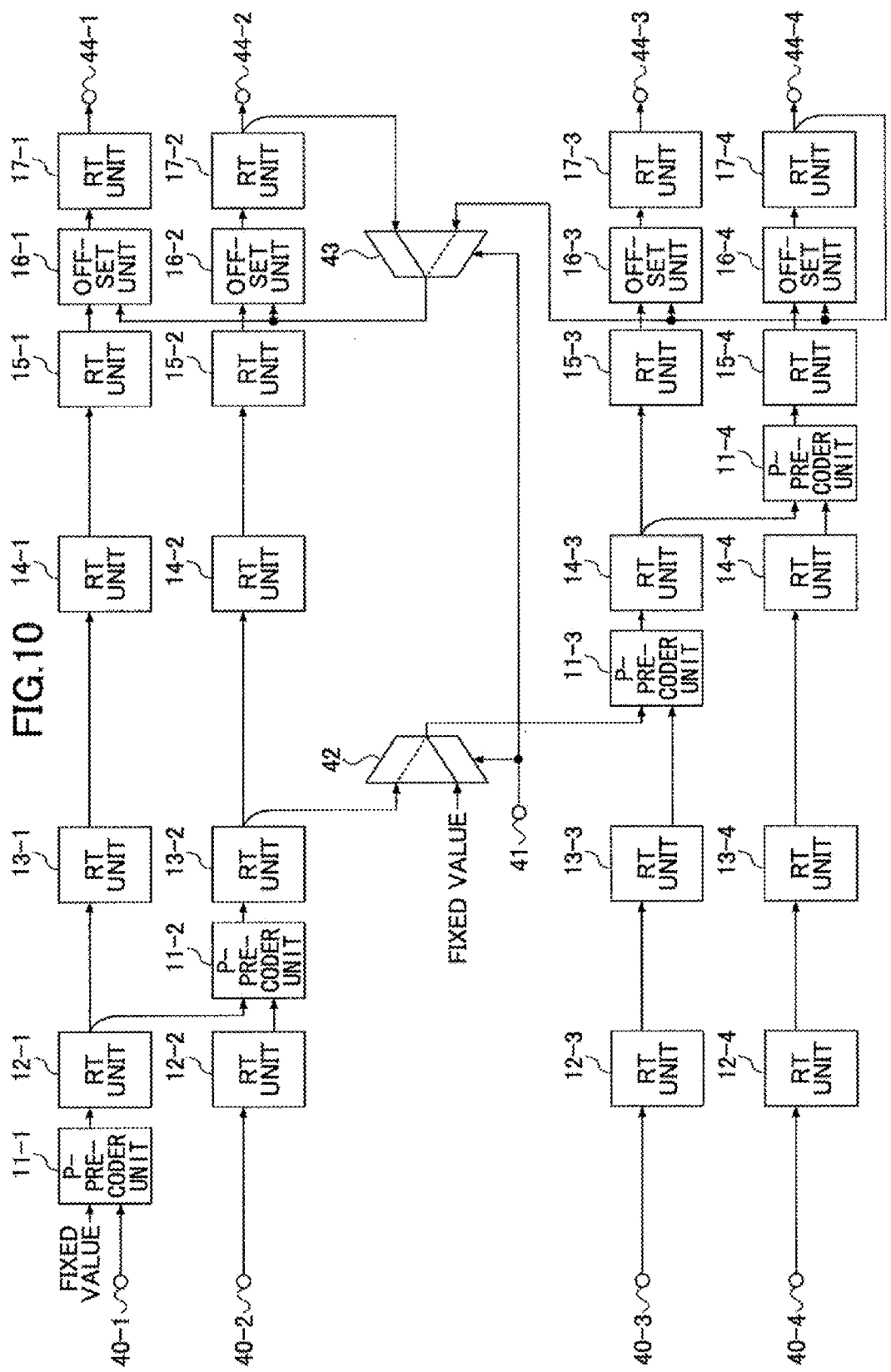
FIG. 10 shows a configuration of a precoder circuit according to the second embodiment.

FIG. 10 shows a configuration of a precoder circuit according to the second embodiment. In FIG. 10, the same reference numerals are given to the components which are common to those of FIG. 4. In FIG. 10, signals of two channels, a data signal I for one channel and a data signal Q for the other, are input to each terminal 40-1, 40-2, 40-3 and 40-4. Each channel includes 8 symbols.

In this example, a 20-Gbps signal of one system is divided into eight channels, and signals of two channels are input to each of the terminals 40-1, 40-2, 40-3 and 40-4. At this point, a mode signal having a value of, for example, 1 is supplied to a terminal 41.

In the case of 10-Gbps signals of two systems, each signal is divided into four channels, and signals of two channels of the first system are input to the terminals 40-1 and 40-2 and signals of two channels of the second system are input to the terminals 40-3 and 40-4. At this point, a mode signal having a value of, for example, 0 is supplied to the terminal 41.

The data signals I and Q of the two channels of the terminal 40-1 are supplied to the parallel precoder unit 11-1, and the data signals I and Q of the two channels of each of the terminals 40-2, 40-3 and 40-4 are supplied to the re-timing units 12-2, 12-3 and 12-4, respectively.

The parallel precoder unit 11-1 on the first level includes eight precoders. Instead of one-symbol preceding modulated signals, fixed values (0 and 0, for example) are supplied to the parallel precoder unit 11-1, which then performs precoding operations using the fixed values and the two-channel data signals I and Q obtained from the terminal 40-1. Two-channel modulated signals output from the parallel precoder unit 11-1 are supplied to the re-timing unit 12-1, at which the modulated signals are synchronized with signals output from the re-timing units 12-2, 12-3 and 12-4. Then, the modulated signals are supplied to the offset unit 16-1 after sequentially passing through the re-timing units 13-1, 14-1 and 15-1. In addition, a part (the last level) of the modulated signals output from the re-timing unit 12-1 is supplied to a parallel precoder unit 11-2 as one-symbol preceding modulated signals.

The parallel precoder unit 11-2 includes eight precoders, and performs precoding operations using the one-symbol preceding modulated signals supplied from the re-timing unit 12-1 and the two-channel data signals I and Q passing through the re-timing unit 12-2. Two-channel modulated signals output from the parallel precoder unit 11-2 are synchronized by the re-timing unit 13-2 with signals output from the re-timing units 13-1, 13-3 and 13-4, and supplied to the offset unit 16-2 after sequentially passing through the re-timing units 14-2 and 15-2. In addition, a part (the last level) of the modulated signals output from the re-timing unit 13-2 is supplied to one of two input terminals of a selector unit 42 as one-symbol preceding modulated signals.

In the selector unit 42, the one-symbol preceding modulated signals from the re-timing unit 13-2 are supplied to one input terminal, and fixed values (0 and 0, for example) are supplied to the other input terminal. The selector unit 42 selects the one-symbol preceding modulated signals supplied from the re-timing unit 13-2 when the mode signal of the terminal 41 has a value of 1 and selects the fixed values when the mode signal has a value of 0, and then supplies the selected ones to the parallel precoder unit 11-3.

The parallel precoder unit 11-3 includes eight precoders, and performs precoding operations using the fixed values or the one-symbol preceding modulated signals supplied from the selector unit 42 and the two-channel data signals I and Q passing through the re-timing units 12-3 and 13-3. Two-channel modulated signals output from the parallel precoder unit 11-3 are synchronized by the re-timing unit 14-3 with signals output from the re-timing units 14-1, 14-2 and 14-4, and supplied to the offset unit 16-3 via the re-timing unit 15-3. In addition, a part (the last level) of the modulated signals output from the re-timing unit 14-3 is supplied to the parallel precoder unit 11-4 as one-symbol preceding modulated signals.

The parallel precoder unit 11-4 includes eight precoders, and performs precoding operations using the one-symbol preceding modulated signals supplied from the re-timing unit 14-3 and the two-channel data signals I and Q passing through the re-timing units 12-4, 13-4 and 14-4. Two-channel modulated signals output from the parallel precoder unit 11-4 are synchronized by the re-timing unit 15-4 with signals output from the re-timing units 15-1, 15-2 and 15-3, and supplied to the offset unit 16-4.

The two-channel modulated signals output in synchronization with each other from the re-timing units 15-1 and 15-2 are supplied to the offset units 16-1 and 16-2, respectively, at which offset operations are performed on the individual set of the two-channel modulated signals output from the re-timing units 15-1 and 15-2, using one-symbol preceding modulated signals supplied from a selector unit 43.

In the selector unit 43, the one-symbol preceding modulated signals from the re-timing unit 17-4 are supplied to one of two input terminals, and the one-symbol preceding modulated signals from the re-timing unit 17-2 are supplied to the other input terminal. The selector unit 43 selects the one-symbol preceding modulated signals supplied from the last-level re-timing unit 17-4 when the mode signal of the terminal 41 has a value of 1 and selects the one-symbol preceding modulated signals supplied from the re-timing unit 17-2 when the mode signal has a value of 0, and then supplies the selected signals to the offset units 16-1 and 16-2.

The two-channel modulated signals output in synchronization with each other from the re-timing units 15-3 and 15-4 are supplied to the offset units 16-3 and 16-4, respectively, at which offset operations are performed on the individual set of the two-channel modulated signals output from the re-timing units 15-3 and 15-4, using the one-symbol preceding modulated signals supplied from the re-timing unit 17-4.

The two-channel modulated signals output from the offset units 16-1, 16-2, 16-3 and 16-4 are synchronized with each other by the re-timing unit 17-1, 17-2, 17-3 and 17-4, respectively, and output from terminals 44-1, 44-2, 44-3 and 44-4, respectively.

Accordingly, precoding of signals of multiple systems can be achieved in the case where the data volumes of signals to be handled are small, and in the case where the data volumes of signals to be handled are large, the process can be changed so as to perform precoding of a signal of a single system.

Third Embodiment

FIGS. 11 through 14 show configurations of a precoder circuit according to the third embodiment.

Figure 11:
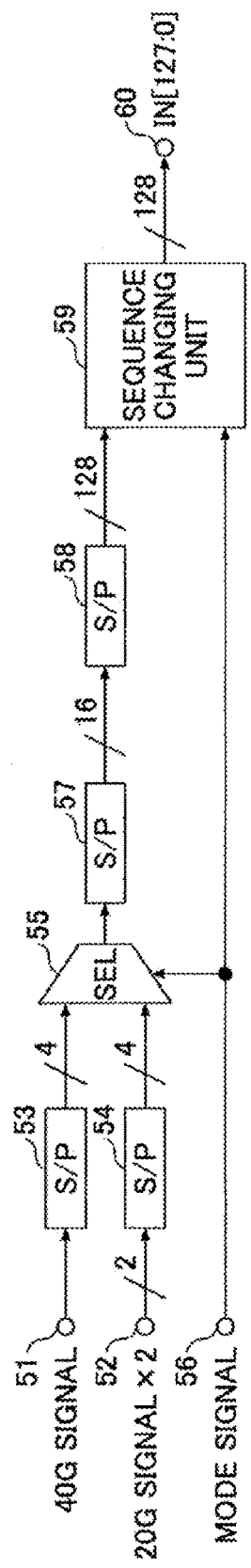
FIG. 11 shows a configuration of a precoder circuit according to the third embodiment.

With reference to FIG. 11, a 40-Gbps signal of one system is supplied to a terminal 51, and 20-Gbps signals of two systems are supplied to a terminal 52. The 40-Gbps signal of one system and the 20-Gbps signals of two systems are converted to 4-bit parallel signals by serial-to-parallel converters 53 and 54, respectively, and then supplied to a selector 55.

The selector 55 selects the output of the serial-to-parallel converter 53 when the mode signal supplied from the terminal 56 has a value of 1, and selects the output of the serial-to-parallel converter 54 when the mode signal has a value of 0. The signal selected by the selector 55 is converted to a 128-bit parallel signal by serial-to-parallel converters 57 and 58, and the sequence of the 128-bit parallel signal is changed by a sequence changing unit 59 according to whether a mode signal input from a terminal 56 has a value of 1 or 0. Eventually, single-channel eight-symbol data IN [127:0] are output from a terminal 60.

Figure 12:
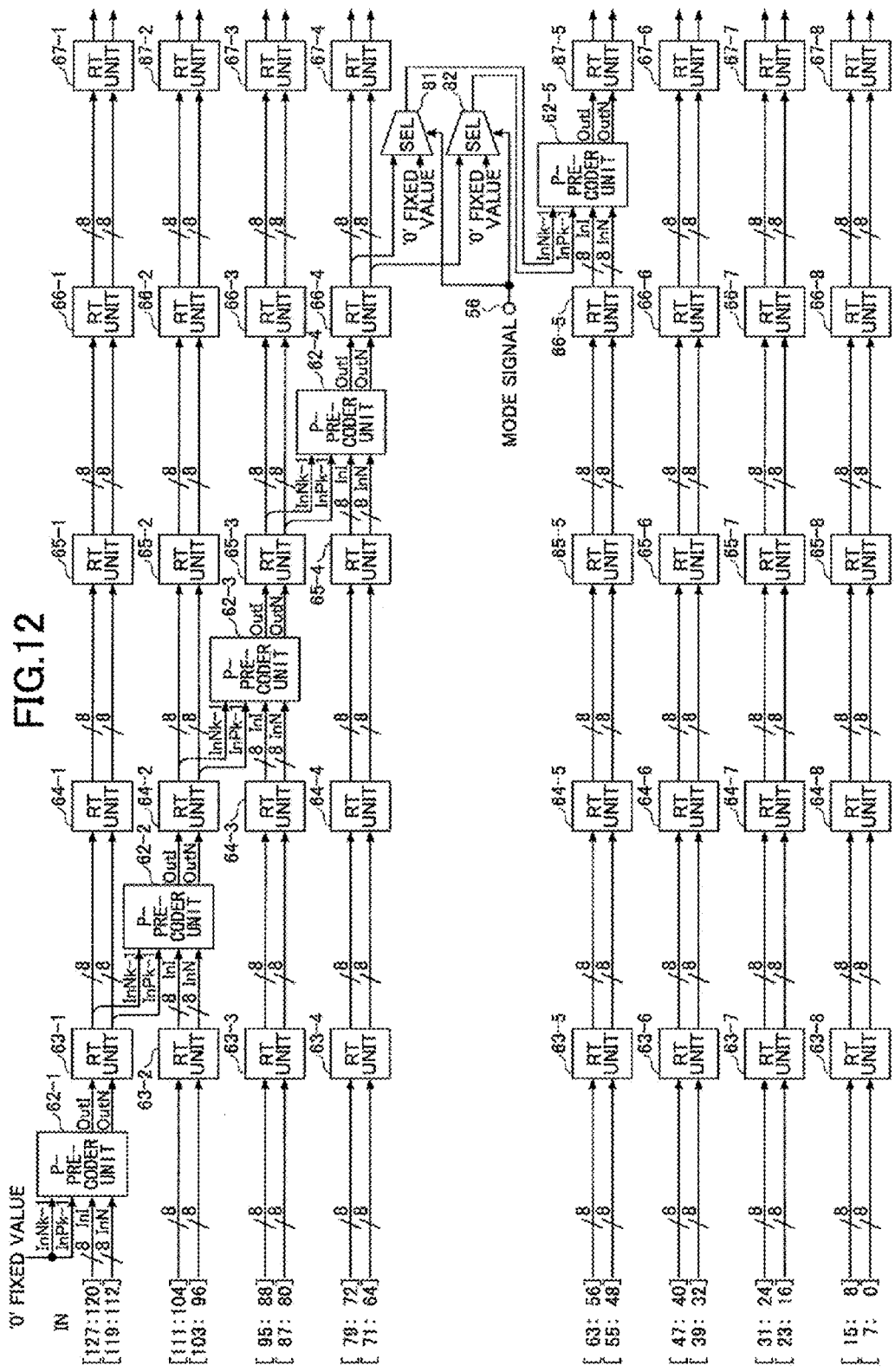
FIG. 12 shows a configuration of the precoder circuit according to the third embodiment.

Among the data IN [127:0], data IN [127:120] and IN [119:112] are supplied to a parallel precoder unit 62-1 of FIG. 12 as the two-channel data signals I and Q. Data IN [111:104] and IN [103:96] are supplied to a parallel precoder unit 62-2 as the two-channel data signals I and Q via a re-timing unit 63-2. Data IN [95:88] and IN [87:80] are supplied to a parallel precoder unit 62-3 as the two-channel data signals I and Q via re-timing units 63-3 and 64-3. Data IN [79:72] and IN [71:64] are supplied to a parallel precoder unit 62-4 as the two-channel data signals I and Q via re-timing units 63-4, 64-4 and 65-4.

Data IN [63:56] and IN [55:48] are supplied to a parallel precoder unit 62-5 of FIG. 12 as the two-channel data signals I and Q via re-timing units 63-5, 64-5, 65-5 and 66-5. Data IN [47:40] and IN [39:32] are supplied to a parallel precoder unit 62-6 of FIG. 13 as the two-channel data signals I and Q via re-timing units 63-6, 64-6, 65-6, 66-6 and 67-6. Data IN [31:24] and IN [23:16] are supplied to a parallel precoder unit 62-7 as the two-channel data signals I and Q via re-timing units 63-7, 64-7, 65-7, 66-7 and 67-7, and 68-7 of FIG. 13. Data IN [15:8] and IN [7:0] are supplied to a parallel precoder unit 62-8 as the two-channel data signals I and Q via re-timing units 63-8, 64-8, 65-8, 66-8 and 67-8, and 68-8 and 69-8 of FIG. 13.

The first-level parallel precoder unit 62-1 includes eight precoders, as illustrated in FIG. 5. Instead of one-symbol preceding modulated signals, fixed values (0 and 0, for example) are supplied to the parallel precoder unit 62-1, which then performs precoding operations using the fixed values and the two-channel data IN [127:120] and IN [119:112]. The two-channel modulated signals output from the parallel precoder unit 62-1 are supplied to an offset unit 71-1 after sequentially passing through re-timing units 63-1, 64-1, 65-1, 66-1 and 67-1, and 68-1, 69-1 and 70-1 of FIG. 13. In addition, a part (the last level) of the modulated signals output from the re-timing unit 63-1 is supplied to the parallel precoder unit 62-2 as one-symbol preceding modulated signals.

The parallel precoder unit 62-2 includes eight precoders, as illustrated in FIG. 5, and performs precoding operations using the one-symbol preceding modulated signals supplied from the parallel precoder unit 62-1 via the re-timing unit 63-1 and the two-channel data signals I and Q after passing through the re-timing unit 63-2. The two-channel modulated signals output from the parallel precoder unit 62-2 are supplied to an offset unit 71-2 after sequentially passing through re-timing units 64-2, 65-2, 66-2 and 67-2, and 68-2, 69-2 and 70-2 of FIG. 13. In addition, a part (the last level) of the modulated signals output from the re-timing unit 64-2 is supplied to the parallel precoder unit 62-3 as one-symbol preceding modulated signals.

The parallel precoder unit 62-3 includes eight precoders, as illustrated in FIG. 5, and performs precoding operations using the one-symbol preceding modulated signals supplied from the parallel precoder unit 62-2 via the re-timing unit 64-2 and the two-channel data signals I and Q after passing through the re-timing units 63-3 and 64-3. The two-channel modulated signals output from the parallel precoder unit 62-3 are supplied to an offset unit 71-3 after sequentially passing through re-timing units 65-3, 66-3 and 67-3, and 68-3, 69-3 and 70-3 of FIG. 13. In addition, a part (the last level) of the modulated signals output from the re-timing unit 65-3 is supplied to the parallel precoder unit 62-4 as one-symbol preceding modulated signals.

The parallel precoder unit 62-4 includes eight precoders, as illustrated in FIG. 5, and performs precoding operations using the one-symbol preceding modulated signals supplied from the parallel precoder unit 62-3 via the re-timing unit 65-3 and the two-channel data signals I and Q after passing through re-timing units 63-4, 64-4 and 65-4. The two-channel modulated signals output from the parallel precoder unit 62-4 are supplied to an offset unit 71-4 after sequentially passing through the re-timing units 66-4 and 67-4, and 68-4, 69-4 and 70-4 of FIG. 13. In addition, a part (the last level) of the modulated signals output from the re-timing unit 66-4 is supplied to selectors 81 and 82 as one-symbol preceding modulated signals.

The selectors 81 and 82 forming a selector unit individually select the one-symbol preceding modulated signals supplied from the re-timing unit 66-4 when the mode signal input to the terminal 56 has a value of 1, and selects the fixed values [0, 0] when the mode signal has a value of 0, and then supplies the selected ones to the parallel precoder unit 62-5.

The parallel precoder unit 62-5 includes eight precoders, as illustrated in FIG. 5, and performs precoding operations using the fixed values or the one-symbol preceding modulated signals supplied from the selectors 81 and 82 and the two-channel data signals I and Q after passing through the re-timing units 63-5, 64-5, 65-5 and 66-5. The two-channel modulated signals output from the parallel precoder unit 62-5 are supplied to an offset unit 71-5 after sequentially passing through re-timing units 67-5, and 68-5, 69-5 and 70-5 of FIG. 13. In addition, a part (the last level) of the modulated signals output from the re-timing unit 67-5 is supplied to the parallel precoder unit 62-6 as one-symbol preceding modulated signals.

Figure 13:
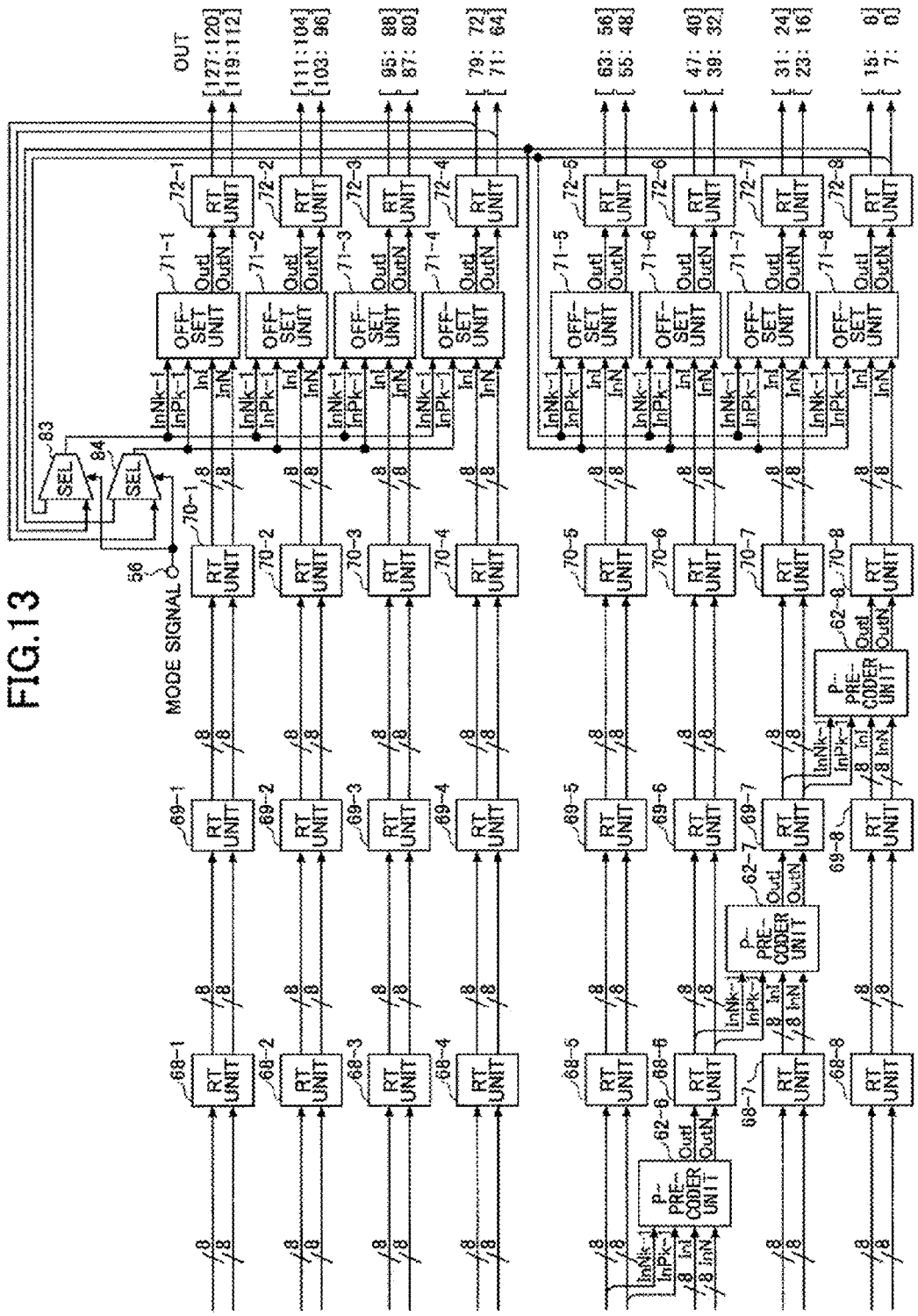
FIG. 13 shows a configuration of the precoder circuit according to the third embodiment.

With reference to FIG. 13, the parallel precoder unit 62-6 includes eight precoders, as illustrated in FIG. 5, and performs precoding operations using the one-symbol preceding modulated signals supplied from the parallel precoder unit 62-5 via the re-timing unit 67-5 and the two-channel data signals I and Q after passing through the re-timing units 63-6, 64-6, 65-6, 66-6 and 67-6 of FIG. 12. The two-channel modulated signals output from the parallel precoder unit 62-6 are supplied to an offset unit 71-6 after sequentially passing through re-timing units 68-6, 69-6 and 70-6. In addition, a part (the last level) of the modulated signals output from the re-timing unit 68-6 is supplied to the parallel precoder unit 62-7 as one-symbol preceding modulated signals.

The parallel precoder unit 62-7 includes eight precoders, as illustrated in FIG. 5, and performs precoding operations using the one-symbol preceding modulated signals supplied from the parallel precoder unit 62-6 via the re-timing unit 68-6 and the two-channel data signals I and Q after passing through the re-timing units 63-7, 64-7, 65-7, 66-7 and 67-7 of FIGS. 12 and 68-7 of FIG. 13. The two-channel modulated signals output from the parallel precoder unit 62-7 are supplied to an offset unit 71-7 after sequentially passing through re-timing units 69-7 and 70-7. In addition, a part (the last level) of the modulated signals output from the re-timing unit 69-7 is supplied to the parallel precoder unit 62-8 as one-symbol preceding modulated signals.

The parallel precoder unit 62-8 includes eight precoders, as illustrated in FIG. 5, and performs precoding operations using the one-symbol preceding modulated signals supplied from the parallel precoder unit 62-7 via the re-timing unit 69-7 and the two-channel data signals I and Q after passing through the re-timing units 63-8, 64-8, 65-8, 66-8 and 67-8 of FIGS. 12 and 68-8 and 69-8 of FIG. 13. The two-channel modulated signals output from the parallel precoder unit 62-8 are supplied to an offset unit 71-8 after sequentially passing through a re-timing unit 70-8.

Each of the offset units 71-1 through 71-4 includes eight off-setters, as illustrated in FIG. 8, and performs offset operations using the one-symbol preceding modulated signals supplied from selectors 83 and 84 and the two-channel modulated signals supplied from the corresponding re-timing units 70-1 through 70-4.

In each of the selectors 83 and 84 forming a selector unit, the one-symbol preceding modulated signals from the re-timing unit 72-8 are supplied to one of two input terminals, and the one-symbol preceding modulated signals from a re-timing unit 72-4 are supplied to the other input terminal. The individual selectors 83 and 84 select the one-symbol preceding modulated signals supplied from the last-level re-timing unit 72-8 when the mode signal has a value of 1 and selects the one-symbol preceding modulated signals supplied from the re-timing unit 72-4 when the mode signal has a value of 0, and then supplies the selected signals to the offset units 71-1 through 71-4.

Each of the offset units 71-5 through 71-8 includes eight off-setters, as illustrated in FIG. 8, and performs offset operations on the individual set of the two-channel modulated signals output from the re-timing units 70-5 through 70-8, using the one-symbol preceding modulated signals supplied from the re-timing unit 72-8.

The two-channel modulated signals output from the offset units 71-1 through 71-8 are synchronized with each other by the re-timing units 72-1 through 72-8, respectively. Two channels each are output from the individual re-timing units 72-1 through 72-8, and accordingly, data OUT [127:0] as a whole are output and supplied to a sequence changing unit 91 of FIG. 14.

Figure 14:
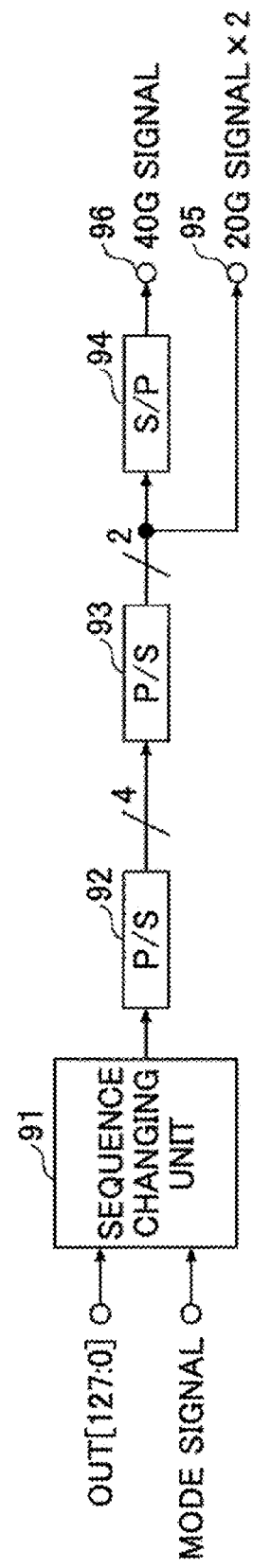
FIG. 14 shows a configuration of the precoder circuit according to the third embodiment.

With reference to FIG. 14, the sequence changing unit 91 changes the sequence of the data according to whether the mode signal has a value of 1 or 0. 128-symbol parallel data output to the sequence changing unit 91 are converted by a parallel-to-serial converter 92 to 4-bit parallel data, which are then converted to 2-bit parallel data by a parallel-to-serial converter 93. The 2-bit parallel data are output from a terminal 95 as 20-Gbps signals of two systems. The 2-bit parallel data output from the parallel-to-serial converter 93 are converted to serial data by a parallel-to-serial converter 94, and then output from a terminal 96 as a 40-Gbps signal of one system.

The present invention is not limited to the above embodiments, and for example, in FIGS. 12 and 13, a selector unit may be provided between the re-timing unit 64-2 and the parallel precoder unit 62-3, and a selector for selecting one set of the one-symbol preceding modulated signals output from the re-timing units 72-2, 72-4 and 72-8 and supplying the selected signals to the offset units 71-1 and 71-2 and a selector for selecting one set of the one-symbol preceding modulated signals output from the re-timing units 72-4 and 72-8 and supplying the selected signals to the offset units 71-3 and 71-4 may be provided in place of the selectors 83 and 84, thereby making the data volumes variable.

In conclusion, according to one embodiment of the present disclosure, precoding is achieved in one cycle even when signal data volumes are large.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present disclosure have been described in detail, it should be understood that various changes, substitutions, and alterations could be made hereto without departing from the spirit and scope of the invention.

What is claimed is:

1. A precoder circuit used for differential phase shift keying, comprising:
a plurality of levels of parallel precoder units, each of which is configured to perform a precoding operation using a data signal having a plurality of symbols and one of a fixed value and a one-symbol preceding modulated signal output from a preceding-level parallel precoder unit so as to obtain a modulated signal, precoding operations of the parallel precoder units being simultaneously performed in a parallel fashion;
a plurality of levels of re-timing units configured to synchronize the modulated signals output from the parallel precoder units; and
a plurality of levels of offset units, each of which is configured to add a phase difference between the fixed value and the one-symbol preceding modulated signal to the modulated signals synchronized by the re-timing units,
wherein the precoder circuit is configured such that the one-symbol preceding modulated signal output from the preceding-level parallel precoder unit is input via a corresponding one of the re-timing units to a next-level parallel precoder unit.

2. The precoder circuit as claimed in claim 1, further comprising:
a first selector unit provided between a predetermined-level parallel precoder unit and the preceding-level parallel precoder unit immediately preceding the predetermined-level parallel precoder unit, and configured to make a selection between the fixed value and the one-symbol preceding modulated signal output from the preceding-level parallel precoder unit and supply the selection to the predetermined-level parallel precoder unit; and
a second selector unit configured to make a selection between the one-symbol preceding modulated signal output from the preceding-level offset unit immediately preceding the second selector unit and the one-symbol preceding modulated signal output from a last-level offset unit and supply the selection to a first-level offset unit through the preceding-level offset unit.

3. The precoder circuit as claimed in claim 1, wherein the precoding operation of a first-level parallel precoder unit among the parallel precoder units is performed using the data signal and the fixed value.

4. The precoder circuit as claimed in claim 2, wherein the precoding operation of a first-level parallel precoder unit among the parallel precoder units is performed using the data signal and the fixed value.

5. The precoder circuit as claimed in claim 3, wherein each of the parallel precoder units includes a plurality of levels of precoders, whose number corresponds to the plural symbols, a first-level precoder performs a precoding operation using a one-symbol data signal and one of the fixed value and the one-symbol preceding modulated signal output from the preceding-level parallel precoder unit, and each of the remaining subsequent precoders performs a precoding operation using a one-symbol data signal and a one-symbol preceding modulated signal output from a preceding-level precoder immediately preceding to the subsequent precoder.

6. The precoder circuit as claimed in claim 4, wherein each of the parallel precoder units includes a plurality of levels of precoders, whose number corresponds to the plural symbols, a first-level precoder performs a precoding operation using a one-symbol data signal and one of the fixed value and the one-symbol preceding modulated signal output from the preceding-level parallel precoder unit, and each of the remaining subsequent precoders performs a precoding operation using a one-symbol data signal and a one-symbol preceding modulated signal output from a preceding-level precoder immediately preceding to the subsequent precoder.

7. The precoder circuit as claimed in claim 5, wherein each of the offset units includes a plurality of levels of off-setters, whose number corresponds to the plural symbols, and each of the off-setters adds the phase difference to the one-symbol modulated signal of the modulated signal output from a corresponding one of the re-timing units.

8. The precoder circuit as claimed in claim 6, wherein each of the offset units includes a plurality of levels of off-setters, whose number corresponds to the plural symbols, and each of the off-setters adds the phase difference to the one-symbol modulated signal of the modulated signal output from a corresponding one of the re-timing units.

9. The precoder circuit as claimed in claim 2, wherein the first selector unit selects, in a first mode, the one-symbol preceding modulated signal output from the preceding-level parallel precoder unit, and selects, in a second mode, the fixed value, and the second selector unit selects, in the first mode, the one-symbol preceding modulated signal output from the last-level offset unit, and selects, in the second mode, the one-symbol preceding modulated signal output from the preceding-level offset unit.

* * * * *